US011115970B2

(12) United States Patent  
Zhou et al.

(10) Patent No.: US 11,115,970 B2  
(45) Date of Patent: Sep. 7, 2021

(54) TECHNIQUES FOR CONFIGURING TRANSMISSION CONFIGURATION STATES IN WIRELESS COMMUNICATIONS

(71) Applicant: QUALCOMM Incorporated, San Diego, CA (US)

(72) Inventors: Yan Zhou, San Diego, CA (US); Makesh Pravin John Wilson, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/597,684

(22) Filed: Oct. 9, 2019

(65) Prior Publication Data

US 2020/0120644 A1 Apr. 16, 2020

Related U.S. Application Data

(60) Provisional application No. 62/744,188, filed on Oct. 11, 2018, provisional application No. 62/747,599, filed on Oct. 18, 2018.

(51) Int. Cl.
*H04W 72/04* (2009.01)
*H04B 7/06* (2006.01)
(Continued)

(52) U.S. Cl.
CPC ........ *H04W 72/042* (2013.01); *H04B 7/0617* (2013.01); *H04L 5/0048* (2013.01);
(Continued)

(58) Field of Classification Search
CPC .. H04W 72/042; H04B 7/0617; H04L 5/0048; H04L 41/0806
See application file for complete search history.

(56) References Cited

U.S. PATENT DOCUMENTS 10,498,511 B2   12/2019   Qin et al.
10,764,896 B2   9/2020    Guo et al.
(Continued)

FOREIGN PATENT DOCUMENTS

CA     3042828 A1     5/2018
WO     2018000430 A1  1/2018

OTHER PUBLICATIONS

International Search Report and Written Opinion—PCT/US2019/055706—ISA/EPO—dated Dec. 12, 2019.
(Continued)

*Primary Examiner* — Ronald B Abelson
(74) *Attorney, Agent, or Firm* — Arent Fox, LLP

(57) ABSTRACT

Aspects described herein relate to configuring transmission configuration states in wireless communications. A capability of a number of transmission configuration states supported for detecting downlink beamformed signals can be indicated. One or more configurations of active transmission configuration states can be received from at least an access point and based on the capability. The one or more configurations can be processed to determine the active transmission configuration states, where at least one of the active transmission configuration states in the one or more configurations corresponds to a distinct state of a given reference signal. One or more downlink beamformed signals received from the access point can be detected based on processing the one or more configurations.

65 Claims, 6 Drawing Sheets

(51) Int. Cl.
*H04L 5/00* (2006.01)
*H04L 12/24* (2006.01)
*H04W 76/27* (2018.01)

(52) U.S. Cl.
CPC ....... *H04L 41/0806* (2013.01); *H04W 72/046* (2013.01); *H04W 76/27* (2018.02)

(56) References Cited

U.S. PATENT DOCUMENTS

| | | | |
|---|---|---|---|
| 2018/0199258 A1 | 7/2018 | Cezanne et al. | |
| 2018/0219606 A1 | 8/2018 | Ng et al. | |
| 2019/0349122 A1* | 11/2019 | Nam | H04L 1/00 |
| 2020/0053717 A1 | 2/2020 | Zhou et al. | |
| 2020/0107341 A1 | 4/2020 | Zhang et al. | |
| 2020/0120656 A1 | 4/2020 | Zhou et al. | |

OTHER PUBLICATIONS

"R1-1809486—Intel—UE features—Table," 3GPP Draft, R1-1809486—Intel—UE Features—Table, 3rd Generation Partnership Project (3GPP), Mobile Competence Centre, 650, Route Des Lucioles, F-06921, Sophia-Antipolis Cedex, France, Aug. 17, 2018 (Aug. 17, 2018), XP051516849, 35 pages, Retrieved from the Internet: URL: http://www.3gpp.org/ftp/tsg%5Fran/WG1%5FRL1/TSGR1%5F94/Docs/R1%2D1809486%2Ezip [retrieved on Aug. 17, 2018] p. 1-p. 23.

ZTE: "Maintenance for Beam Management," 3GPP Draft, 3GPP TSG RAN W1 Meeting #94bis, R1-1810214, Maintenance for Beam Management, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517630,11 pages, Retrieved from the Internet: URL: http://www.3gpp.org/ftp/tsg%5Fran/WG1%5FRL1/TSGR1%5F94b/Docs/R1%2D1810214%2Ezip [retrieved on Sep. 29, 2018], p. 1-p. 11.

Qualcomm Incorporated: "Beam Management for NR", 3GPP draft; R1-1811633, 3rd Generation Partnership Project (3GPP), Mobile Competence Centre; 650, Route Des Lucioles; F-06921, Sophia-Antipolis Cedex; France, vol. RAN WG1, No. Chengdu, China, Sep. 30, 2018 (Sep. 30, 2018), 13 pages, XP051519027, Retrieved from the Internet: URL:http://www.3gpp.org/ftp/tsg%5Fran/WG1%5FRL/TSGR1%5F94b/Docs/R1%2D1811633%2Ezip.

* cited by examiner

TECHNIQUES FOR CONFIGURING TRANSMISSION CONFIGURATION STATES IN WIRELESS COMMUNICATIONS

CLAIM OF PRIORITY UNDER 35 U.S.C. § 119

The present application for patent claims priority to Provisional Application No. 62/744,188, entitled "TECHNIQUES FOR CONFIGURING ACTIVE SPATIAL RELATIONS IN WIRELESS COMMUNICATIONS" filed Oct. 11, 2018 and Provisional Application No. 62/747,599, entitled "TECHNIQUES FOR CONFIGURING TRANSMISSION CONFIGURATION INDICATOR (TCI) STATES IN WIRELESS COMMUNICATIONS" filed Oct. 18, 2018, which are assigned to the assignee hereof and hereby expressly incorporated by reference herein for all purposes.

BACKGROUND

Aspects of the present disclosure relate generally to wireless communication systems, and more particularly, to configuring transmission configuration states.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In addition, 5G NR supports the use of millimeter wave (mmW) antenna systems where nodes of the network (e.g., gNodeBs, user equipment (UEs), etc.) can include arrays of antennas and/or multiple subarrays of antennas in multiple radio frequency integrated circuits (RFICs) or other modules. As such, the nodes can apply beamforming techniques to facilitate communicating therebetween.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a user equipment (UE) is provided. The method includes transmitting a message comprising data corresponding to one or more active transmission configuration states supported by the UE for detecting downlink beamformed signals, receiving, from at least an access point, a response corresponding to one or more active transmission configuration states, determining the one or more active transmission configuration states based, at least in part, on the response, wherein an active transmission configuration state of the determined active transmission configuration states corresponds to one of multiple possible triggers for a reference signal, and detecting, based on at least one of the determined active transmission configuration states, one or more downlink beamformed signals transmitted by the access point.

In another example, an apparatus for wireless communication is provided that includes a transceiver, a memory configured to store instructions, and one or more processors communicatively coupled with the transceiver and the memory. The one or more processors are configured to transmit a message comprising data corresponding to one or more active transmission configuration states supported by the apparatus for detecting downlink beamformed signals, receive, from at least an access point, a response corresponding to one or more active transmission configuration states, determine the one or more active transmission configuration states based, at least in part, on the response, wherein an active transmission configuration state of the determined active transmission configuration states corresponds to one of multiple possible triggers for a reference signal, and detect, based on at least one of the determined active transmission configuration states, one or more downlink beamformed signals transmitted by the access point.

In another example, an apparatus for wireless communication is provided that includes means for transmitting a message comprising data corresponding to one or more active transmission configuration states supported by the UE for detecting downlink beamformed signals, means for receiving, from at least an access point, a response corresponding to one or more active transmission configuration states, means for determining the one or more active transmission configuration states based, at least in part, on the response, wherein an active transmission configuration state of the determined active transmission configuration states corresponds to one of multiple possible triggers for a reference signal, and means for detecting, based on at least one of the determined active transmission configuration states, one or more downlink beamformed signals transmitted by the access point.

In another example, a computer-readable medium, including code executable by one or more processors for wireless communications is provided. The code includes code for transmitting a message comprising data corresponding to one or more active transmission configuration states supported by the UE for detecting downlink beamformed signals, code for receiving, from at least an access point, a response corresponding to one or more active transmission configuration states, code for determining the one or more active transmission configuration states based, at least in part, on the response, wherein an active transmission configuration state of the determined active transmission configuration states corresponds to one of multiple possible triggers for a reference signal, and code for detecting, based on at least one of the determined active transmission configuration states, one or more downlink beamformed signals transmitted by the access point.

In another example, a method of wireless communication at an access point is provided. The method includes receiving, from a UE, a message comprising data corresponding to one or more transmission configuration states supported by the UE for detecting downlink beamformed signals, generating, based, at least in part, on the message, a response corresponding to one or more active transmission configuration states, wherein an active transmission configuration state of the one or more active transmission configuration states corresponds to one of multiple possible triggers for a reference signal, and transmitting the response to the UE.

In another example, an apparatus for wireless communication is provided that includes a transceiver, a memory configured to store instructions, and one or more processors communicatively coupled with the transceiver and the memory. The one or more processors are configured to receive, from a UE, a message comprising data corresponding to one or more transmission configuration states supported by the UE for detecting downlink beamformed signals, generate, based, at least in part, on the message, a response corresponding to one or more active transmission configuration states, wherein an active transmission configuration state of the one or more active transmission configuration states corresponds to one of multiple possible triggers for a reference signal, and transmit the response to the UE.

In another example, an apparatus for wireless communication is provided including means for receiving, from a UE, a message comprising data corresponding to one or more transmission configuration states supported by the UE for detecting downlink beamformed signals, means for generating, based, at least in part, on the message, a response corresponding to one or more active transmission configuration states, wherein an active transmission configuration state of the one or more active transmission configuration states corresponds to one of multiple possible triggers for a reference signal, and means for transmitting the response to the UE.

In another example, a computer-readable medium, including code executable by one or more processors for wireless communications is provided. The code includes code for receiving, from a UE, a message comprising data corresponding to one or more transmission configuration states supported by the UE for detecting downlink beamformed signals, code for generating, based, at least in part, on the message, a response corresponding to one or more active transmission configuration states, wherein an active transmission configuration state of the one or more active transmission configuration states corresponds to one of multiple possible triggers for a reference signal, and code for transmitting the response to the UE.

In another example, a method of wireless communication is provided that includes indicating a capability of a number of transmission configuration indicator (TCI) states supported for detecting downlink beamformed signals, receiving, from at least an access point and based on the capability, one or more configurations of active TCI states, processing the one or more configurations to determine the active TCI states, wherein at least one of the active TCI states in the one or more configurations corresponds to a trigger state for transmitting a given aperiodic channel state information reference signal (A-CSI-RS) and at least another one of the active TCI states in the one or more configurations corresponds to a different trigger state for transmitting the given A-CSI-RS, and detecting, based on processing the one or more configurations, one or more downlink beamformed signals received from the access point.

In a further examples, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
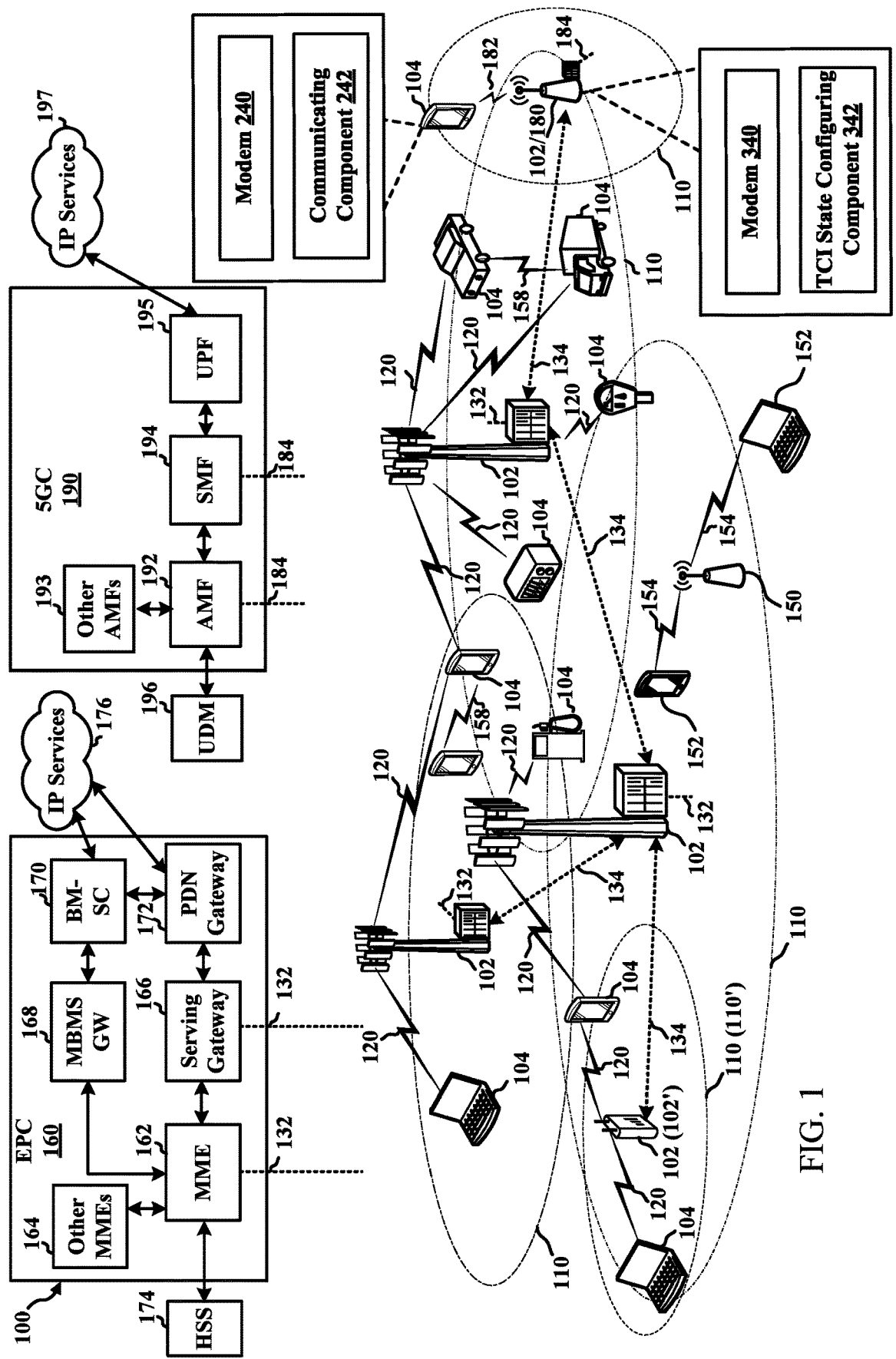
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring transmission configuration states in wireless communications. In certain examples, a transmission configuration state may correspond to a transmission configuration indicator (TCI) state, or the like. For example, an active TCI state can be used to define active downlink beamformed signals (also referred to herein as "beams") for receiving one or more downlink channels, such as a downlink control channel (e.g., physical downlink control channel (PDCCH) defined in long term evolution (LTE)), a downlink shared channel (e.g., physical downlink shared channel (PDSCH) defined in LTE), etc. For example, TCI states may correspond to detectable reference signals and/or beamformed signals, which may be based on reference signals, for communications, as described herein. TCI states may, for example, indicate a transmission configuration that includes a quasi-colocation (QCL) relationship between a downlink (DL) reference signal (RS) in one RS set and a corresponding antenna port (e.g., a PDCCH demodulation reference signal (DMRS) port, PDSCH DMRS port, etc.). In an example, an aperiodic channel state information reference signal (A-CSI-RS) can include multiple trigger states that may each have an associated TCI state.

The active TCI states, for example, can be configured by a first node (e.g., an access point) for transmitting to a second node (e.g., a UE). In an example, the second node can indicate (e.g., to the first node) a capability for detecting active TCI states in the form of downlink beamformed signals received from the first node. For example, where the first node is an access point and the second node is a UE, the UE can indicate a capability of a number of active TCI states to the access point, which can correspond to a number of active downlink beamformed signals the UE is capable of detecting from the access point.

In this example, the access point can determine, based on the indicated capability, a configuration of active TCI states for indicating to the UE. For example, the access point can generate the configuration of active TCI states by determining which of multiple selected TCI states are to count as one active TCI state in the configuration. For example, the access point can determine a selected TCI state as an active TCI state where the TCI state corresponds to an A-CSI-RS. In addition, for example, where a selected TCI state corresponds to an A-CSI-RS, the access point can determine each distinct TCI state of the A-CSI-RS as an active TCI state. In this example, each A-CSI-RS resource may be configured with a number of trigger states, and each trigger state can have an associated TCI state. In this example, each of the associated TCI states for the A-CSI-RS can be determined as an active TCI state for the configuration. In this example, the UE can receive the configuration and can accordingly determine the active TCI states in a similar regard, such that the configuration complies with the indicated capability. The UE can use the set of active TCI states to determine one or more parameters related to associated downlink beamformed signals that may be received from the access point. In this regard, the UE can limit the number of possible active TCI states configured by the access point, which can allow the UE to more efficiently use the active TCI states for detecting downlink beamformed signals based on its capabilities.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180 (e.g., also referred to as a next generation Node B, or a Node B defined in 5G NR), as described further herein. In one example, some nodes of the wireless communication system may have a modem 240 and communicating component 242 for receiving a configuration of active TCI states, and some nodes may have a modem 340 and TCI state configuring component 342 for generating and/or transmitting a configuration of active TCI states, as described herein. Though a UE 104 is shown as having the modem 240 and communicating component 242 and a base station 102/gNB 180 is shown as having the modem 340 and TCI state configuring component 342, this is one illustrative example, and substantially any node or type of node may include a modem 240 and communicating component 242 and/or a modem 340 and TCI state configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can indicate one or more capabilities of the UE 104 regarding active TCI states, and can receive an associated configuration of active TCI states for detecting downlink beamformed signals. In addition, TCI state configuring component 342 can receive the capability indicated by the UE 104 and can accordingly generate and transmit a configuration of active TCI states related to downlink beamformed signals to be transmitted to the UE 104.

Figure 2:
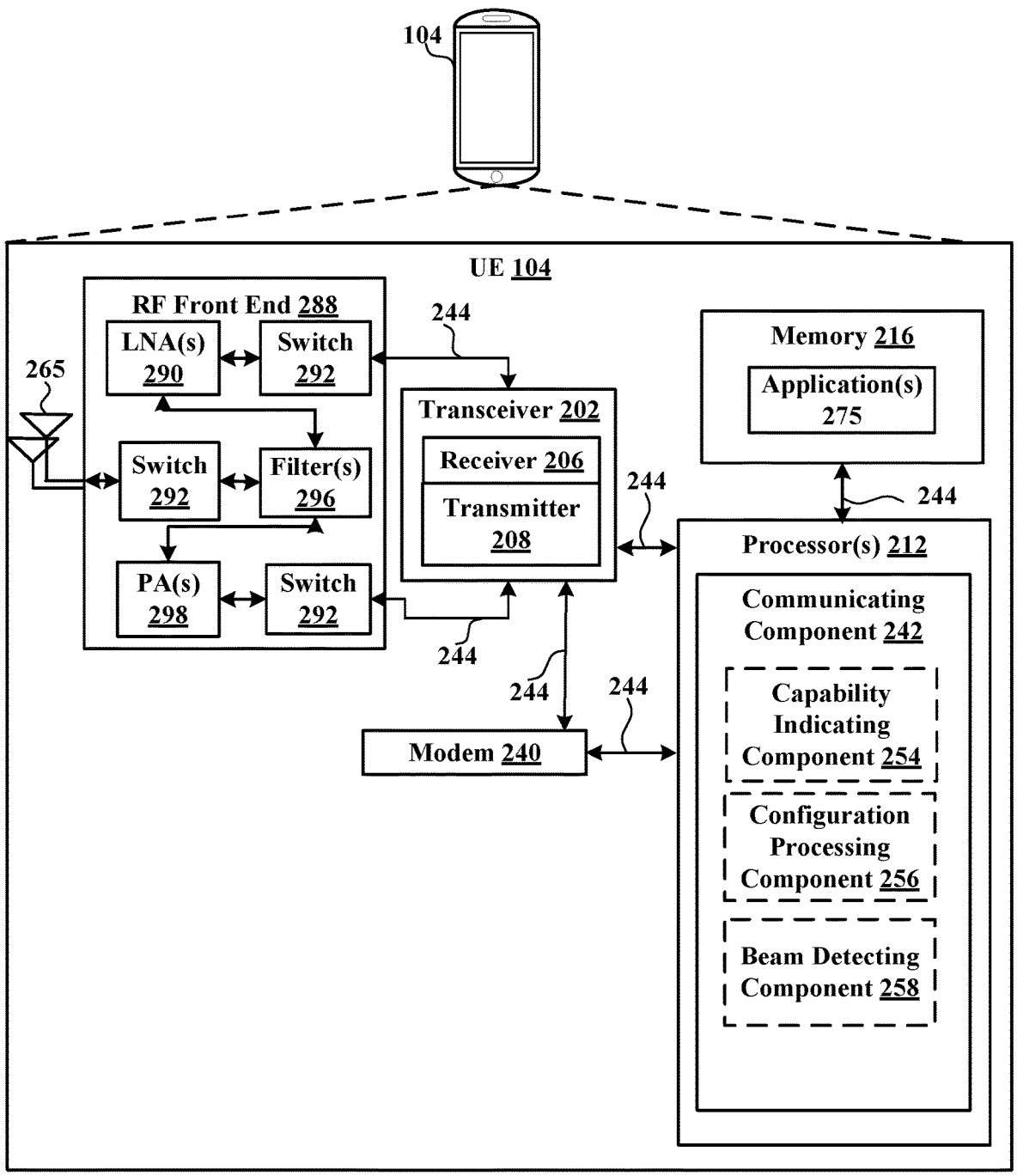
FIG. 2 is a block diagram illustrating an example of a UE, in accordance with various aspects of the present disclosure.
Figure 3:
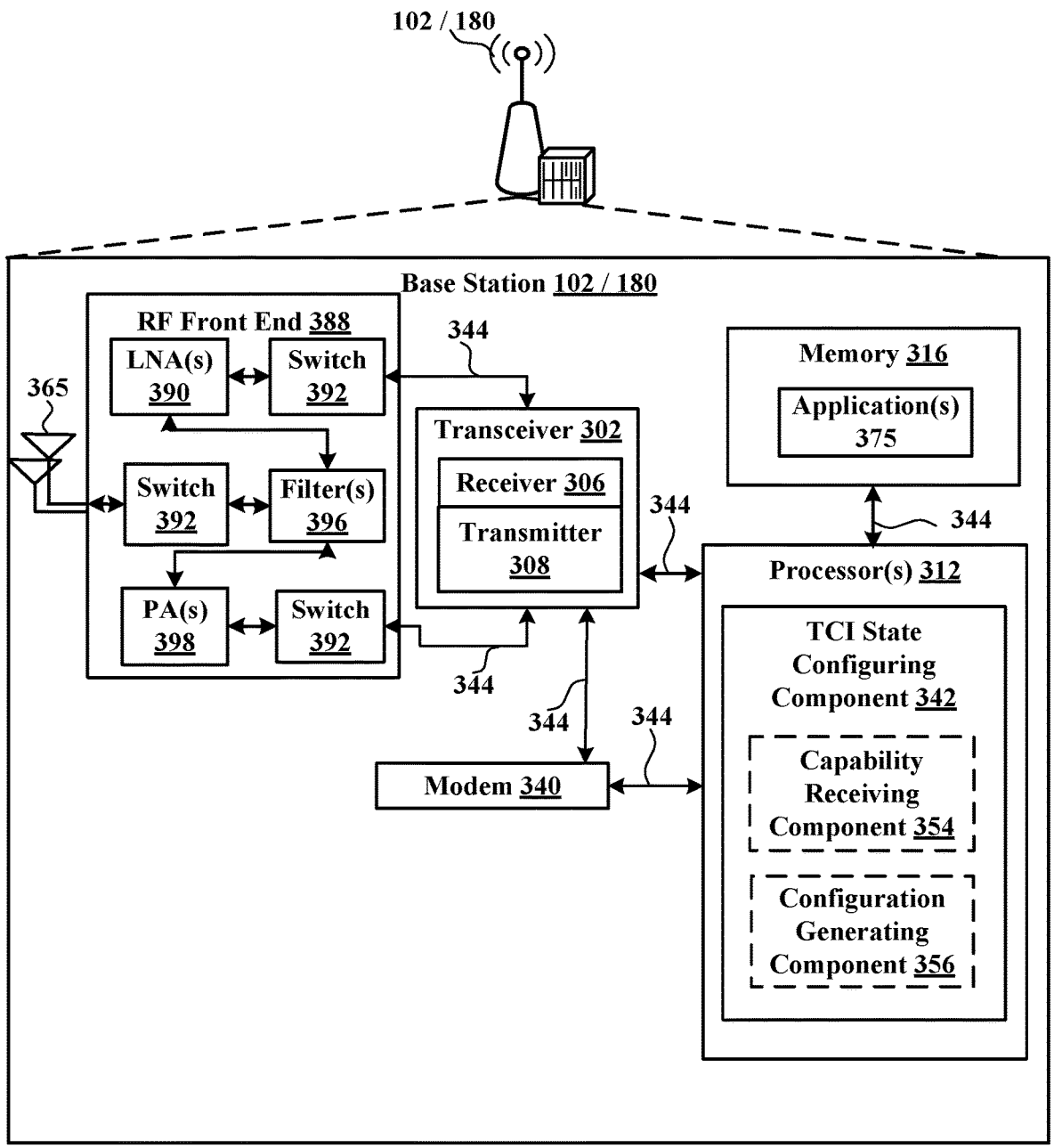
FIG. 3 is a block diagram illustrating an example of a base station, in accordance with various aspects of the present disclosure.
Figure 4:
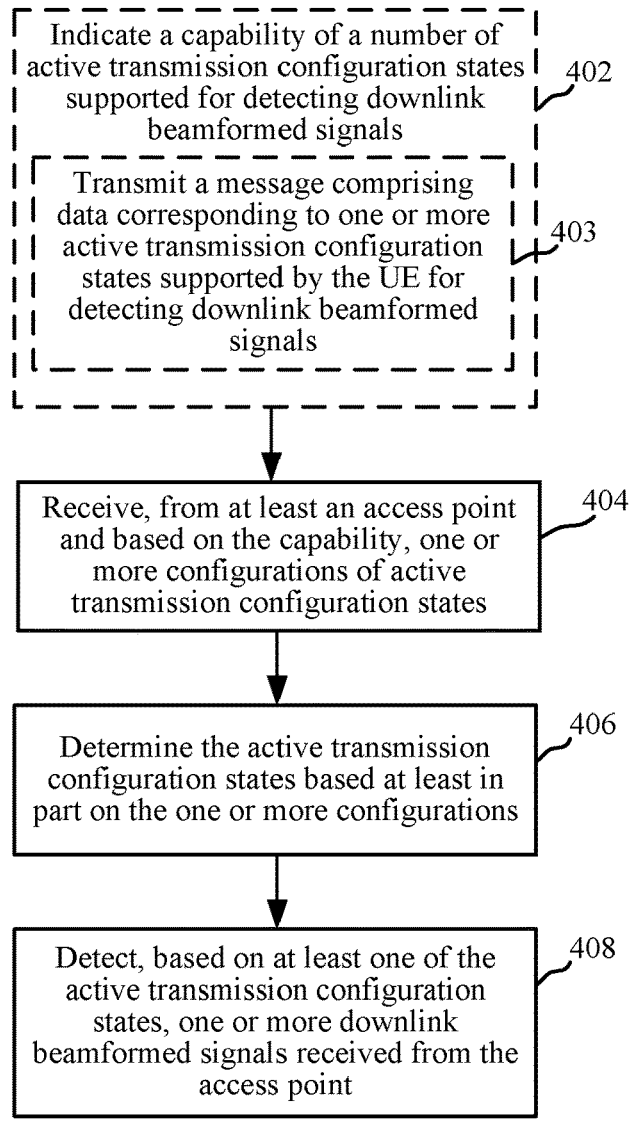
FIG. 4 is a flow chart illustrating an example of a method for receiving a configuration of active transmission configuration states, in accordance with various aspects of the present disclosure.
Figure 5:
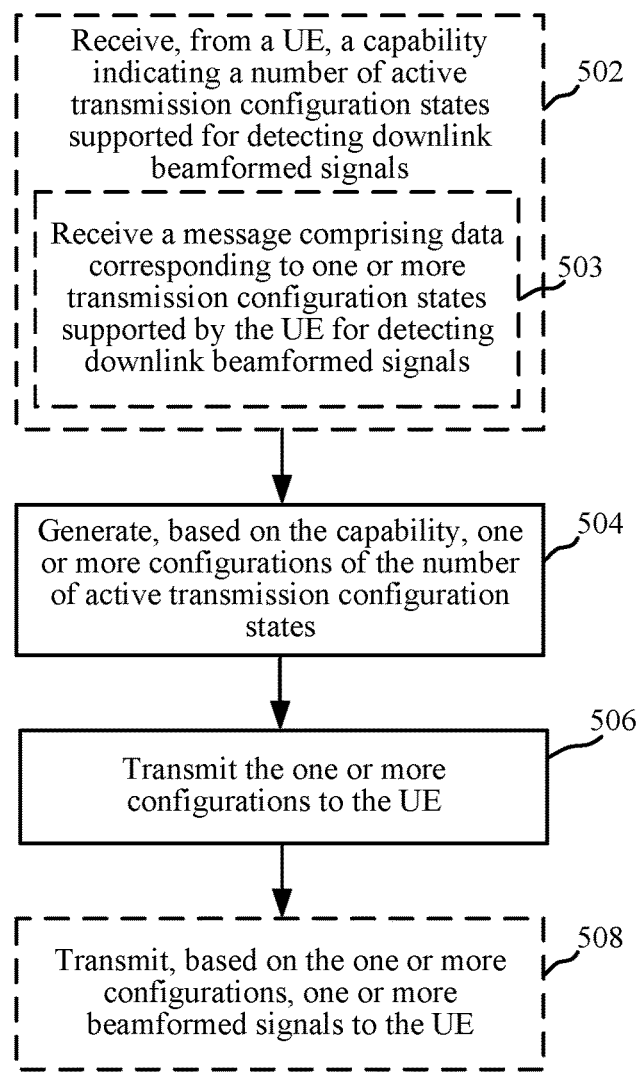
FIG. 5 is a flow chart illustrating an example of a method for generating a configuration of active transmission configuration states, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 to enable one or more of the functions described herein related to receiving a configuration of active TCI states.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a capability indicating component 254 for indicating a capability for active TCI states at the UE 104, a configuration processing component 256 for receiving and processing one or more configurations transmitted by an access point based on the indicated capability, where the configuration(s) can indicate multiple active TCI states, and/or a beam detecting component 258 for detecting one or more downlink beamformed signals transmitted based on the configuration(s) (e.g., based on the multiple active TCI states indicated by the configuration(s)).

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102/180 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and TCI state configuring component 342 for configuring multiple active TCI states for communicating with a UE 104.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, TCI state configuring component 342 can optionally include a capability receiving component 354 for receiving an indication of a capability of a UE 104 with respect to active TCI states, and/or a configuration generating component 356 for generating one or more configurations of active TCI states related to one or more reference signals based on the capability or otherwise.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for receiving and utilizing a configuration of active transmission configuration states. In an example, a UE 104 can perform the functions described in method 400 using one or more of the components described in FIGS. 1-2.

In method 400, optionally at Block 402, a capability of a number of active transmission configuration states supported for detecting downlink beamformed signals can be indicated. In an aspect, capability indicating component 254, e.g., in conjunction with processor(s) 212, memory 216, transceiver 202, communicating component 242, etc., can indicate (e.g., to an access point, such as base station 102/180, or multiple access points, a node of a wireless network, such as a core network component, etc. of EPC 160, 5GC 190, etc.), the capability of the number of active transmission configuration states supported for detecting downlink beamformed signals. For example, the transmission configuration states can include TCI states.

In an example, indicating the capability at Block 402 may optionally include, at Block 403, transmitting a message including data corresponding to the one or more transmission configuration states supported by the UE for detecting downlink beamformed signals. For example, capability indicating component 254 can indicate the capability, and/or transmit the message, as part of initiating a connection with the access point (e.g., as part of a random access channel (RACH) procedure, as part of higher layer signaling, such as RRC signaling, and/or the like), based on a request received from the access point for the supported capability, and/or the like.

In another example, capability indicating component 254 can indicate the number as an integer number (e.g., 4, 8, etc.) of active TCI states the UE 104 can support. Additionally, the number of active TCI states can relate to the number supported by the UE 104 in detecting downlink beamformed signals received from the access point, which may include reference signals, beams containing PDCCH and/or PDSCH communications from the access point, etc. For example, indicated number of active TCI states can be the maximum number of TCI states supported by the UE 104 when counting each trigger state of one or more A-CSI-RSs (if one or more A-CSI-RSs are configured) as a separate active TCI state and when counting each reference signal (or beam) that does not include an A-CSI-RS as a separate TCI state.

In method 400, at Block 404, one or more configurations of active transmission configuration states can be received from at least an access point based on the capability. In an aspect, configuration processing component 256, e.g., in conjunction with processor(s) 212, memory 216, transceiver 202, communicating component 242, etc., can receive, from at least the access point (e.g., base station 102/180, and/or other access points, core network nodes, etc.) and based on the capability, the one or more configurations of active transmission configuration states. In one example, configuration processing component 256 can receive the one or more configurations in response to, or otherwise based on, the message transmitted by the UE 104 to indicate the capability of the number of transmission configuration states supported. For example, based on the number of supported active transmission configuration states indicated by the UE 104, the access point can generate the configuration of active transmission configuration states to include transmission configuration states (e.g., TCI states) associated with one or more reference signals or other signals, as described further herein. In addition, the configuration may be received in one or more of MAC-CE or RRC signaling.

In one example, multiple signals may be received, such as an initial configuration of configured TCI states, which may indicate multiple TCI states that are configured for possible usage as TCI states for receiving downlink communications from the base station 102/180. In an example, the configured TCI states may be indicated in broadcast signaling from the base station 102/180 or otherwise known/configured at the base station 102 and UE 104 (e.g., based on a wireless communication technology standard). In another example, configuration processing component 256 can receive the one or more signals including a configuration that indicates or down-selects an initial configuration (or current configuration) of configured TCI states to include a subset of the TCI states referred to as active TCI states. For example, configuration processing component 256 may receive an initial configuration of possible TCI states in an RRC signaling and a down selecting of the TCI states to the number of active TCI states in one or more MAC-CEs, etc. For example, the MAC CE can indicate a bitmap indicating which of the configured TCI states are selected as active TCI states. In other examples, a set of the active TCI states can be received in RRC signaling and another set of the active TCI states can be received in one or more MAC-CEs (which may down select a set of TCI states received in other signaling), etc. In another example, configuration processing component 256 can receive the one or more signals including downlink control information (DCI) from the access point configuring the multiple trigger states for an A-CSI-RS, where each trigger state can be counted as a single TCI state, as described herein, for the purposes of complying with a capability indicated by the UE 104. In addition, in an example, configuration processing component 256 can receive signaling that down selects one or more of the trigger states for use and associating with its own TCI state.

In an example, in a given configuration or set of multiple configurations, the access point can configure the active TCI states for UE 104 such that in the configuration, one active TCI state can be indicated for (1) each TCI state that does not contain or otherwise correspond to an A-CSI-RS, and (2) for each distinct TCI state of a TCI state that contains or otherwise corresponds to an A-CSI-RS. For example, where a TCI state contains an A-CSI-RS (e.g., an aperiodic non-zero-power (NZP) CSI-RS), each distinct TCI state of the A-CSI-RS (e.g., trigger state for triggering transmission of the A-CSI-RS) can be indicated as one active TCI state. In this example, each A-CSI-RS resource can be configured with up to a certain number of trigger states (e.g., 64 trigger states in some implementations), where each trigger state configured for the A-CSI-RS may have its own TCI state. In this example, the access point may configure multiple trigger states for a given A-CSI-RS, and each configured trigger state may be indicated as a separate TCI state in the configuration. Moreover, each of the configured TCI states can have at least one of a distinct TCI identifier or a distinct QCL type (e.g., Type-D, where the QCL Type-D can be indicated as a QCL type for the RS). In this example, a count of the one or more distinct TCI states of one or more A-CSI-RSs, and/or the count of one or more distinct TCI states of one or more A-CSI-RSs added to a second count of other TCI states for other reference signals in the one or more configurations, can be less than or equal to the number of TCI states indicated in the capability.

In one example, capability indicating component 254 (e.g., at Block 402) can indicate a capability for (1) a maximum number of supported active TCI states per bandwidth part (BWP) per component carrier (CC) including control and data (which may be indicated from the set {1, 2, 4, 8}, for example); and (2) a maximum number of configured TCI states per CC for PDSCH (which may be indicated from the set {4, 8, 16, 32, 64, 128}, for example and/or may be mandated to 64). The configuration(s) received by configuration processing component 256 can indicate active TCI states as including distinct TCI states for MAC-CE or RRC selected TCI states not containing aperiodic NZP CSI-RS, and distinct TCI states for TCI states available for DCI triggering of aperiodic NZP CSI-RS for those containing aperiodic NZP CSI-RS, as described above. In addition, separate configurations may be received per BWP per CC for control and data, and per CC for PDSCH.

In any case, in one example, configuration processing component 256 can receive the configuration in MAC-CE or RRC or other higher layer signaling from the access point, as described. The signaling can include various information elements that indicate the active TCI states in the multiple types of reference signals. Configuration processing component 256 can process the configuration and use the configuration for detecting and processing beamformed signals as received from the access point, as described further herein. For example, configuration processing component 256 can determine, based on the configuration, the active TCI states and/or corresponding resources on which the associated downlink beamformed signals can be transmitted, etc.

In method 400, at Block 406, the active transmission configuration states can be determined based at least in part on the one or more configurations. In an aspect, configuration processing component 256, e.g., in conjunction with processor(s) 212, memory 216, transceiver 202, communicating component 242, etc., can determine the active transmission configuration states based at least in part on the one or more configurations. For example, this can include determining the one or more active transmission configuration states based, at least in part, on the response received at Block 404, which can include the one or more configurations. In an example, an active transmission configuration state of the determined active transmission configuration states can correspond to one of multiple possible triggers for a reference signal, as described further herein. For example, the one or more configurations may indicate certain parameters of the TCI states and/or associated beamformed signals, which the UE 104 can use in attempting to detect the beamformed signals as received from the access point. Moreover, the configuration processing component 256 can determine the various TCI states from the configuration, which can include determining the distinct TCI states for each TCI state not containing a A-CSI-RS and for each distinct TCI state possibly associated with, or otherwise configured for, a given A-CSI-RS, where the given A-CSI-RS can include or be associated with multiple distinct TCI states (e.g., per trigger state). In this regard, for example, at least one of the active TCI states in the configuration can correspond to a distinct TCI state of the given A-CSI-RS, where the A-CSI-RS can include multiple possible TCI states.

In method 400, at Block 408, one or more downlink beamformed signals received from the access point can be detected based on at least one of the active transmission configuration states. In an aspect, beam detecting component 258, e.g., in conjunction with processor(s) 212, memory 216, transceiver 202, communicating component 242, etc., can detect, based on at least one of the active transmission configuration states, the one or more downlink beamformed signals received from the access point. For example, the configuration may indicate certain parameters of the downlink beamformed signals, which the UE 104 can use in attempting to detect the downlink beamformed signals as received from the access point. For example, the downlink beamformed signals may relate to reference signals (e.g., A-CSI-RSs or other RSs) beamformed using the same beams as used for PDCCH/PDSCH communications. In another example, the beamformed signals may relate to the PDCCH/PDSCH communications from the access point.

For example, as described, the configuration can indicate the TCI states as related to corresponding reference signals, whether A-CSI-RS or other reference signals, and can include related parameters, such as a reference signal index, which may be one of a synchronization signal (SS) block index, a CSI-RS index, or SRS information (which may include an SRS resource and a bandwidth part). In this regard, beam detecting component 258 may determine resources (e.g., DMRS port) related to the reference signals based on the reference signal index, the SRS information, etc., for the reference signal beams indicated in the active TCI states. In another example, beam detecting component 258 may determine the resources as related to a specified TCI index and/or related information (e.g., QCL type, etc.). Beam detecting component 258 can detect the reference signals (and/or corresponding trigger state(s), TCI state(s), etc.) transmitted by the access point as the one or more downlink beamformed signals.

In one specific non-limiting example, active TCI states for PDCCH and PDSCH can be determined (e.g., by the access point in generating a configuration) as follows. In this example, 3 TCI states are down selected by MAC-CE from all TCI states configured for PDCCH and PDSCH, and those 3 selected TCI states have TCI state ID from 1 to 3 and can be applied for PDCCH and PDSCH transmissions. Suppose TCI state ID 1 only contains periodic CSI-RS (e.g., not A-CSI-RS). This TCI state is counted as one active TCI state for the configuration. Suppose TCI state ID 2 only contains semi-persistent CSI-RS (e.g., not A-CSI-RS). This TCI state is counted as one active TCI state. Suppose TCI state ID 3 contains aperiodic CSI-RS, which is RRC configured with total 32 trigger states and each trigger state is associated with a TCI state with a distinct ID varying from TCI state ID 4 to 35. In this example, a single aperiodic CSI-RS can indicate 32 TCI states by indicating different trigger states in DCI triggering this aperiodic CSI-RS. Thus, in this example, the 32 TCI states associated with this aperiodic CSI-RS are counted as 32 active TCI states. As a result, the number of total active TCI states for configuration for PDCCH and PDSCH in this example is 1+1+32=34 (e.g., instead of 1+1+1=3 originally down selected TCI states). Thus, where the UE 104 indicates a capability for at least 34 TCI states, the base station 102/180 can configure the TCI states as in this example, as described further herein, or where the UE 104 indicates a capability for less than 34 TCI state, the base station 102/180 may refrain from configuring all 32 trigger states for the A-CSI-RS and/or may refrain from configuring one or more of the semi-persistent CSI-RS to achieve the maximum number of supported TCI states as indicated by the UE 104.

FIG. 5 illustrates a flow chart of an example of a method 500 for generating a configuration of active transmission configuration states. In an example, a base station 102/180 can perform the functions described in method 500 using one or more of the components described in FIGS. 1 and 3.

In method 500, optionally at Block 502, a capability indicating a number of active transmission configuration states supported for detecting downlink beamformed signals can be received from a UE. In an aspect, capability receiving component 354, e.g., in conjunction with processor(s) 312, memory 316, transceiver 302, TCI state configuring component 342, etc., can receive, from the UE (e.g., UE 104), the capability indicating the number of active transmission configuration states supported for detecting downlink beamformed signals.

In one example, receiving the capability at Block 502 may optionally include, at Block 503, receiving a message comprising data corresponding to one or more transmission configuration states supported by the UE for detecting downlink beamformed signals. For example, this may include signaling from the UE 104 when establishing a connection with the access point (e.g., as part of a RACH procedure) and may indicate an integer number of supported active TCI states.

In another example, the capability can correspond to a value from which the number of supported active TCI states can be determined, such as a UE class, radio type or version/software version, etc. In any case, TCI state configuring component 342 can determine, e.g., based at least in part on the indicated capability, the number of active TCI states the UE 104 can support.

In method 500, at Block 504, one or more configurations of the number of active transmission configuration states can be generated based on the capability. In an aspect, configuration generating component 356, e.g., in conjunction with processor(s) 312, memory 316, transceiver 302, TCI state configuring component 342, etc., can generate, based on the capability, the one or more configurations of the number of active transmission configuration states. For example, configuration generating component 356 can configure the active TCI states to comply with the number indicated by the capability (e.g., based, at least in part on the message). In addition, for example, an active transmission configuration state of the one or more active transmission configuration states in the one or more configurations can correspond to one of multiple possible triggers for a reference signal. As described, for example, configuration generating component 356 can configure a plurality of configured TCI states that may possibly be used as active TCI states for transmitting downlink beamformed signals. In an example, configuration generating component 356 can configure the configured TCI states in a RRC message or other signaling, which may be regardless of the indicated capability. In addition or alternatively, configuration generating component 356 can further indicate or down select a plurality of active TCI states from the configured TCI states using one or more MAC-CEs, etc., which may be based on the indicated capability. For example, the MAC CE can include a bitmap indicating which of the configured TCI states are selected as active TCI states.

In yet another example, configuration generating component 356 can further configure one or more A-CSI-RSs and can indicate a number of trigger states for the one or more A-CSI-RSs. In one example, indicating the trigger states may include transmitting DCI or other signaling indicating the trigger states. In addition, in an example, configuration generating component 356 can down select one or more of the trigger states for use and associating with its own TCI state, and may indicating the selection to the UE 104 (e.g., in DCI or other signaling, etc.). As described, for example, each trigger state of each A-CSI-RS can be counted as one TCI state such that configuration generating component 356 can configure the active TCI states so as not to exceed the indicated capability of the UE 104, as described herein.

In these examples, for each selected TCI state, if the selected TCI state does not contain or otherwise correspond to an A-CSI-RS, it can be counted as one active TCI state for the configuration. If the selected TCI state contains or otherwise corresponds to an A-CSI-RS, each distinct TCI state of the A-CSI-RS can be counted as one active TCI state for the configuration. For example, each A-CSI-RS resource can be configured with up to 64 trigger states each having its own TCI state. In this regard, each distinct TCI state configured or further down selected by MAC-CE (e.g., as one of the trigger states) can be counted as one active TCI state. In addition, each distinct TCI state can be identified by a distinct TCI ID and/or a distinct QCL type (e.g., QCL Type-D RS). For example, configuration generating component 356 can configure the TCI states using this counting so as not to exceed the maximum number indicated in the capability indication received from the UE 104.

Moreover, for example, configuration generating component 356 can configure one or more arrays of TCI states for the UE 104. The configuration generating component 356 can separately indicate the configuration of active TCI states using identifiers of the TCI states and/or the associated reference signals that are configured in a separate RS configuration. In one example, configuration generating component 356 can generate the configuration as separate arrays of active TCI states, which can be sent via RRC signaling, MAC CE (as a down selecting of already configured TCI states), etc. In an example, configuration generating component 356 can generate and separate configurations (1) per BWP per CC for control and data, and (2) per CC for PDSCH, as described above.

In method 500, at Block 506, the one or more configurations can be transmitted to the UE. In an aspect, TCI state configuring component 342, e.g., in conjunction with processor(s) 312, memory 316, transceiver 302, etc., can transmit the one or more configurations to the UE (e.g., UE 104). For example, TCI state configuring component 342 can transmit the configuration to the UE 104 in RRC or higher layer signaling, as one or more arrays of configured TCI states and/or corresponding reference signals, as a down selecting of TCI states in MAC CEs, an indication of trigger states for the A-CSI-RS in DCI, a down selecting of trigger states, etc. This may be in response to, or otherwise based on, the message received from the UE 104 indicating the number of supported transmission configuration states (e.g., as received in Block 502). As described, the UE 104 can obtain the configuration(s) and accordingly detect the one or more active TCI states as one or more downlink beamformed signals.

In method 500, optionally at Block 508, one or more downlink beamformed signals can be transmitted to the UE based on the one or more configurations. In an aspect, TCI state configuring component 342, e.g., in conjunction with processor(s) 312, memory 316, transceiver 302, etc., can transmit, based on the one or more configurations, the one or more downlink beamformed signals to the UE (e.g., UE 104). For example, TCI state configuring component 342 can transmit the one or more reference signals, which may be based on one or more TCI states (e.g., possibly multiple TCI states for A-CSI-RS having multiple configured trigger states) over resources indicated in the configuration. The UE 104 can accordingly receive the one or more reference signals, and can use the reference signals for determining a beam for receiving downlink communications (e.g., PDCCH/PDSCH communications) from the access point. In another example, the one or more downlink beamformed signals can include the downlink communications (e.g., PDCCH/PDSCH communications) from the access point.

Figure 6:
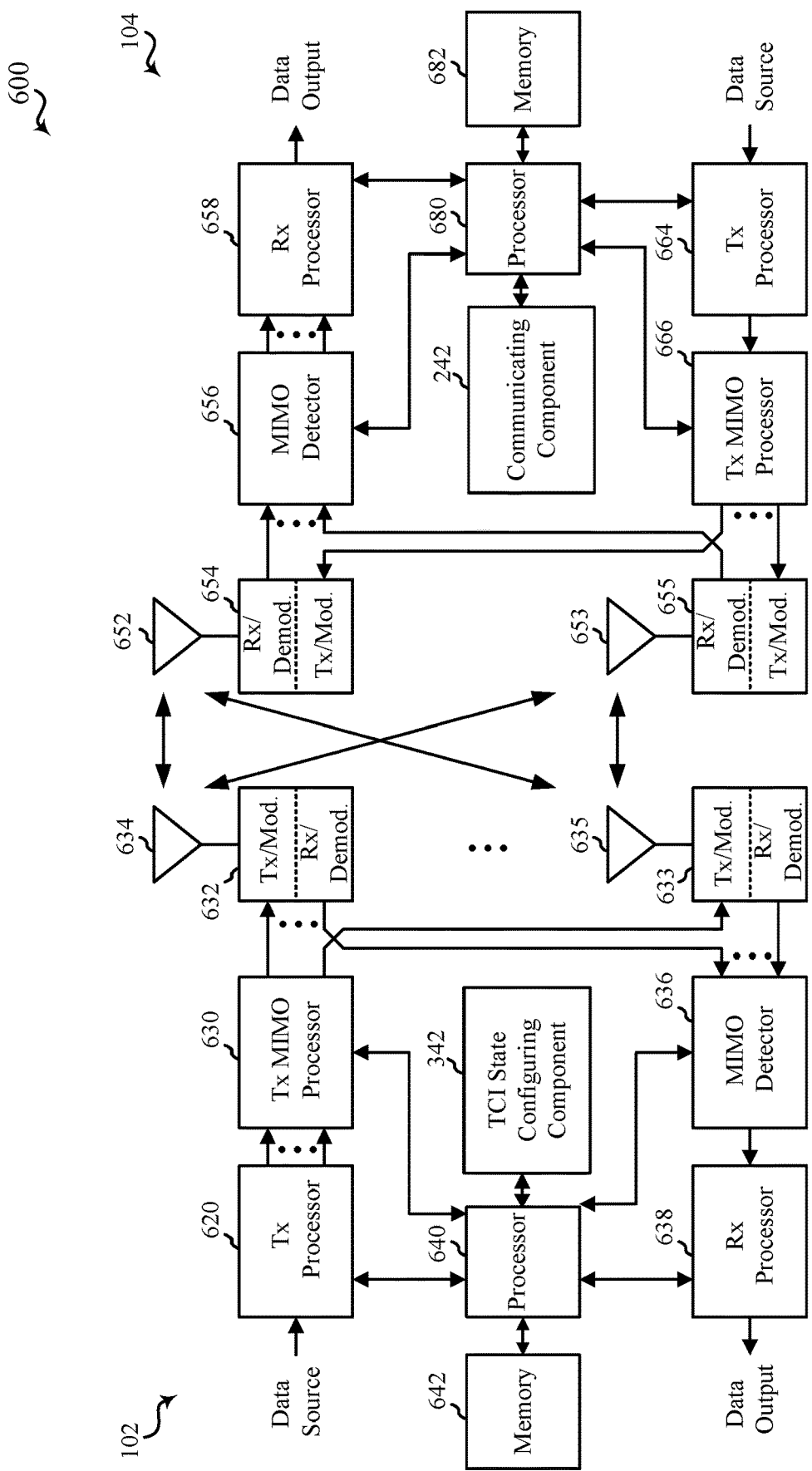
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a TCI state configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method of wireless communication, comprising, at a user equipment (UE):

transmitting a message comprising data corresponding to one or more active transmission configuration states supported by the UE for detecting downlink beamformed signals;

receiving, from at least an access point and based on the message, a response corresponding to one or more active transmission configuration states;

determining the one or more active transmission configuration states based, at least in part, on the response, wherein an active transmission configuration state of the determined active transmission configuration states corresponds to one of multiple possible triggers for a reference signal; and detecting, based on at least one of the determined active transmission configuration states, one or more downlink beamformed signals transmitted by the access point.

2. The method of example 1, wherein the data is indicative, at least in part, of one or more transmission configuration indicator (TCI) states corresponding to the one or more transmission configuration states. Thus, for example, a UE can indicate its capability to receive a number of TCI states, and the access point can accordingly configure the UE with a set of TCI states based on the number.

3. The method of any of examples 1 or 2, wherein the data is indicative, at least in part, of a number of the one or more transmission configuration states.

4. The method of any of examples 1 to 3, wherein the reference signal comprises an aperiodic channel state information reference signal (A-CSI-RS). Thus, for example, a UE can be configured with transmission configuration states that correspond to a A-CSI-RS, e.g., alone or along with other types of reference signals.

5. The method of example 4, wherein the A-CSI-RS is in one TCI state selected by a media access control (MAC)-control element (CE) or radio resource control (RRC) for physical downlink control channel (PDCCH) or physical downlink shared channel (PDSCH) transmission. In this regard, for example, the A-CSI-RS may have at least one TCI states, as can other types of reference signals.

6. The method of any of examples 4 or 5, wherein the A-CSI-RS is configured with a certain number of trigger states, wherein each trigger state has its own TCI state. Thus, for example, each trigger for a A-CSI-RS can have its own TCI state so that the number of TCI states configured for the UE does not exceed the indicated number of which the UE is capable when considering each trigger as a single TCI state.

7. The method of example 6, wherein the number of trigger states of the A-CSI-RS is configured based on the message.

8. The method of any of examples 1 to 7, wherein the response comprises at least one of: a CSI-RS, semi-persistent CRS, or aperiodic CSI-RS (A-CSI-RS). Thus, for example, the UE can receive a configuration of TCI states for various types of reference signals.

9. The method of example 8, wherein the A-CSI-RS comprises a number of trigger states, which are configurable based on the message.

10. The method of any of examples 1 to 9, wherein the multiple possible triggers have different transmission configuration states for the reference signal. As described, for example, this can allow the UE to be configured with a transmission configuration state for each of multiple possible triggers so as not to exceed the number indicated by the UE.

11. The method of any of examples 1 to 10, wherein the response is indicative, at least in part, of one or more configurations of the one or more active transmission configuration states.

12. The method of any of examples 1 to 11, wherein the response is indicative, at least in part, of one or more active transmission configuration indicator (TCI) states corresponding to the one or more active transmission configuration states.

13. The method of any of examples 1 to 12, wherein one or more additional active transmission configuration states in the one or more configurations correspond to another one of the multiple possible triggers for the reference signal. In this example, as described above, the configuration(s) can specify individual transmission configuration state for each of the multiple possible triggers for the reference signal.

14. The method of any of examples 1 to 13, wherein the reference signal comprises an aperiodic channel state information reference signal (A-CSI-RS) and wherein one or more additional active transmission configuration states in the one or more configurations correspond to a transmission configuration state that does not include an A-CSI-RS.

15. The method of any of examples 1 to 14, wherein the active transmission configuration state corresponds to a transmission configuration state that is at least one of configured by a radio resource control (RRC) message or further indicated or down selected by a media access control (MAC) control element (CE). In this example, configuring the transmission configuration states can allow for simplifying configuration of the active transmission configuration states (e.g., by indicating an index or other identifier of the state within a set of transmission configuration states).

16. The method of example 15, wherein processing the one or more configurations includes determining the active transmission configuration state based on detecting a distinct transmission configuration identifier or a distinct quasi-colocation (QCL) type of the active transmission configuration state.

17. The method of any of examples 1 to 16, wherein the one or more configurations of active transmission configuration states include selected transmission configuration states indicated in at least one of a media access control (MAC) control element (CE) or a radio resource control (RRC) signal related to at least one of a downlink control channel or a downlink shared channel.

18. An apparatus for wireless communication, comprising:
   a transceiver;
   a memory configured to store instructions; and
   one or more processors communicatively coupled with the transceiver and the memory, wherein the one or more processors are configured to:
      transmit a message comprising data corresponding to one or more active transmission configuration states supported by the apparatus for detecting downlink beamformed signals;
      receive, from at least an access point and based on the message, a response corresponding to one or more active transmission configuration states;
      determine the one or more active transmission configuration states based, at least in part, on the response, wherein an active transmission configuration state of the determined active transmission configuration states corresponds to one of multiple possible triggers for a reference signal; and
      detect, based on at least one of the determined active transmission configuration states, one or more downlink beamformed signals transmitted by the access point.

19. The apparatus of example 18, wherein the data is indicative, at least in part, of one or more transmission configuration indicator (TCI) states corresponding to the one or more transmission configuration states.

20. The apparatus of any of examples 18 or 19, wherein the data is indicative, at least in part, of a number of the one or more transmission configuration states.

21. The apparatus of any of examples 18 to 20, wherein the reference signal comprises an aperiodic channel state information reference signal (A-CSI-RS).

22. The apparatus of example 21, wherein the A-CSI-RS is in one TCI state selected by a media access control (MAC)-control element (CE) or radio resource control (RRC) for physical downlink control channel (PDCCH) or physical downlink shared channel (PDSCH) transmission.

23. The apparatus of any of examples 18 to 22, wherein the multiple possible triggers have different transmission configuration states for the reference signal.

24. The apparatus of any of examples 18 to 23, wherein the response is indicative, at least in part, of one or more configurations of the one or more active transmission configuration states.

25. The apparatus of any of examples 18 to 24, wherein the response is indicative, at least in part, of one or more active transmission configuration indicator (TCI) states corresponding to the one or more active transmission configuration states.

26. The apparatus of any of examples 18 to 25, wherein one or more additional active transmission configuration states in the one or more configurations correspond to another one of the multiple possible triggers for the reference signal.

27. The apparatus of any of examples 18 to 26, wherein the reference signal comprises an aperiodic channel state information reference signal (A-CSI-RS) and wherein one or more additional active transmission configuration states in the one or more configurations correspond to a transmission configuration state that does not include an A-CSI-RS.

28. The apparatus of any of examples 18 to 27, wherein the active transmission configuration state corresponds to a transmission configuration state that is at least one of configured by a radio resource control (RRC) message or further indicated or down selected by a media access control (MAC) control element (CE).

29. The apparatus of example 28, wherein the one or more processors are configured to process the one or more configurations at least in part by determining the active transmission configuration state based on detecting a distinct transmission configuration identifier or a distinct quasi-colocation (QCL) type of the active transmission configuration state.

30. The apparatus of any of examples 18 to 29, wherein the one or more configurations of active transmission configuration states include selected transmission configuration states indicated in at least one of a media access control (MAC) control element (CE) or a radio resource control (RRC) signal related to at least one of a downlink control channel or a downlink shared channel.

31. An apparatus for wireless communication, comprising:
   means for transmitting a message comprising data corresponding to one or more active transmission configuration states supported by the UE for detecting downlink beamformed signals;
   means for receiving, from at least an access point, a response corresponding to one or more active transmission configuration states;
   means for determining the one or more active transmission configuration states based, at least in part, on the response, wherein an active transmission configuration state of the determined active transmission configuration states corresponds to one of multiple possible triggers for a reference signal; and
   means for detecting, based on at least one of the determined active transmission configuration states, one or more downlink beamformed signals transmitted by the access point.

32. The apparatus of example 31, wherein the data is indicative, at least in part, of one or more transmission configuration indicator (TCI) states corresponding to the one or more transmission configuration states.

33. The apparatus of any of examples 31 or 32, wherein the data is indicative, at least in part, of a number of the one or more transmission configuration states.

34. The apparatus of any of examples 31 to 33, wherein the reference signal comprises an aperiodic channel state information reference signal (A-CSI-RS).

35. The apparatus of example 34, wherein the A-CSI-RS is in one TCI state selected by a media access control (MAC)-control element (CE) or radio resource control (RRC) for physical downlink control channel (PDCCH) or physical downlink shared channel (PDSCH) transmission.

36. The apparatus of any of examples 31 to 35, wherein the multiple possible triggers have different transmission configuration states for the reference signal.

37. The apparatus of any of examples 31 to 36, wherein the response is indicative, at least in part, of one or more configurations of the one or more active transmission configuration states.

38. The apparatus of any of examples 31 to 37, wherein the response is indicative, at least in part, of one or more active transmission configuration indicator (TCI) states corresponding to the one or more active transmission configuration states.

39. A computer-readable medium, comprising code executable by one or more processors for wireless communications, the code comprising:

code for transmitting a message comprising data corresponding to one or more active transmission configuration states supported by the UE for detecting downlink beamformed signals;

code for receiving, from at least an access point, a response corresponding to one or more active transmission configuration states;

code for determining the one or more active transmission configuration states based, at least in part, on the response, wherein an active transmission configuration state of the determined active transmission configuration states corresponds to one of multiple possible triggers for a reference signal; and code for detecting, based on at least one of the determined active transmission configuration states, one or more downlink beamformed signals transmitted by the access point.

40. The computer-readable medium of example 39, wherein the data is indicative, at least in part, of one or more transmission configuration indicator (TCI) states corresponding to the one or more transmission configuration states.

41. The computer-readable medium of any of examples 39 or 40, wherein the data is indicative, at least in part, of a number of the one or more transmission configuration states.

42. The computer-readable medium of any of examples 39 to 41, wherein the reference signal comprises an aperiodic channel state information reference signal (A-CSI-RS).

43. The computer-readable medium of example 42, wherein the A-CSI-RS is in one TCI state selected by a media access control (MAC)-control element (CE) or radio resource control (RRC) for physical downlink control channel (PDCCH) or physical downlink shared channel (PDSCH) transmission.

44. The computer-readable medium of any of examples 39 to 43, wherein the multiple possible triggers have different transmission configuration states for the reference signal.

45. The computer-readable medium of any of examples 39 to 44, wherein the response is indicative, at least in part, of one or more configurations of the one or more active transmission configuration states.

46. The computer-readable medium of any of examples 39 to 45, wherein the response is indicative, at least in part, of one or more active transmission configuration indicator (TCI) states corresponding to the one or more active transmission configuration states.

47. A method of wireless communication, comprising, at an access point:

receiving, from a user equipment (UE), a message comprising data corresponding to one or more transmission configuration states supported by the UE for detecting downlink beamformed signals;

generating, based, at least in part, on the message, a response corresponding to one or more active transmission configuration states, wherein an active transmission configuration state of the one or more active transmission configuration states corresponds to one of multiple possible triggers for a reference signal; and transmitting the response to the UE.

48. The method of example 47, wherein the data is indicative, at least in part, of one or more transmission configuration indicator (TCI) states corresponding to the one or more transmission configuration states.

49. The method of any of examples 47 or 48, wherein the data is indicative, at least in part, of a number of the one or more transmission configuration states.

50. The method of any of examples 47 to 49, wherein the reference signal comprises an aperiodic channel state information reference signal (A-CSI-RS).

51. The method of example 50, wherein the A-CSI-RS is in one transmission configuration state selected by a media access control (MAC)-control element (CE) or radio resource control (RRC) for physical downlink control channel (PDCCH) or physical downlink shared channel (PDSCH) transmission.

52. The method of any of examples 50 or 51, wherein the A-CSI-RS is configured with a certain number of trigger states, wherein each trigger state has its own TCI state.

53. The method of example 52, wherein the number of trigger states of the A-CSI-RS is configured based on the message.

54. The method of any of examples 47 to 53, wherein the response comprises at least one of: a CSI-RS, semi-persistent CRS, or aperiodic CSI-RS (A-CSI-RS).

55. The method of example 54, wherein the A-CSI-RS comprises a number of trigger states, which are configurable based on the message.

56. The method of any of examples 47 to 55, wherein the multiple possible triggers have different transmission configuration states for the reference signal.

57. The method of any of examples 47 to 56, wherein the response is indicative, at least in part, of one or more configurations of the one or more active transmission configuration states.

58. The method of any of examples 47 to 57, wherein the response is indicative, at least in part, of one or more active transmission configuration indicator (TCI) states corresponding to the one or more active transmission configuration states.

59. The method of any of examples 47 to 58, further comprising transmitting, based on the one or more configurations, one or more beamformed signals to the UE.

60. The method of any of examples 47 to 59, wherein the reference signal comprises an aperiodic channel state information reference signal (A-CSI-RS), and wherein one or more additional active transmission configuration states in the one or more configurations each represent one of the one or more active transmission configuration states in the one or more configurations and correspond to either a first TCI state that does not include the A-CSI-RS or a second TCI state that includes another one of multiple possible triggers for the A-CSI-RS.

61. The method of any of examples 47 to 60, wherein the active transmission configuration state is at least one of configured by radio resource control (RRC) message or further indicated or down selected by a media access control (MAC) control element (CE) for the reference signal.

62. The method of example 61, wherein generating the one or more configurations includes indicating the active transmission configuration state as one of the one or more active transmission configuration states based on detecting a distinct transmission configuration identifier or a distinct quasi-colocation (QCL) type of the active transmission configuration state.

63. The method of any of examples 47 to 62, wherein the one or more configurations of active transmission configuration states correspond to selected transmission configuration states indicated in at least one of a media access control (MAC) control element (CE) or a radio resource control (RRC) signal sent to the UE and related to at least one of a downlink control channel or a downlink shared channel.

64. An apparatus for wireless communication, comprising:
 a transceiver;
 a memory configured to store instructions; and
 one or more processors communicatively coupled with the transceiver and the memory, wherein the one or more processors are configured to:
  receive, from a user equipment (UE), a message comprising data corresponding to one or more transmission configuration states supported by the UE for detecting downlink beamformed signals;
  generate, based, at least in part, on the message, a response corresponding to one or more active transmission configuration states, wherein an active transmission configuration state of the one or more active transmission configuration states corresponds to one of multiple possible triggers for a reference signal; and
  transmit the response to the UE.

65. The apparatus of example 64, wherein the data is indicative, at least in part, of one or more transmission configuration indicator (TCI) states corresponding to the one or more transmission configuration states.

66. The apparatus of any of examples 64 or 65, wherein the data is indicative, at least in part, of a number of the one or more transmission configuration states.

67. The apparatus of any of examples 64 to 66, wherein the reference signal comprises an aperiodic channel state information reference signal (A-CSI-RS).

68. The apparatus of example 67, wherein the A-CSI-RS is in one transmission configuration state selected by a media access control (MAC)-control element (CE) or radio resource control (RRC) for physical downlink control channel (PDCCH) or physical downlink shared channel (PDSCH) transmission.

69. The apparatus of any of examples 64 to 68, wherein the multiple possible triggers have different transmission configuration states for the reference signal.

70. The apparatus of any of examples 64 to 69, wherein the response is indicative, at least in part, of one or more configurations of the one or more active transmission configuration states.

71. The apparatus of any of examples 64 to 70, wherein the response is indicative, at least in part, of one or more active transmission configuration indicator (TCI) states corresponding to the one or more active transmission configuration states.

72. The apparatus of any of examples 64 to 71, wherein the one or more processors are further configured to transmit, based on the one or more configurations, one or more beamformed signals to the UE.

73. The apparatus of any of examples 64 to 72, wherein the reference signal comprises an aperiodic channel state information reference signal (A-CSI-RS), and wherein one or more additional active transmission configuration states in the one or more configurations each represent one of the one or more active transmission configuration states in the one or more configurations and correspond to either a first TCI state that does not include the A-CSI-RS or a second TCI state that includes another one of multiple possible triggers for the A-CSI-RS.

74. The apparatus of any of examples 64 to 73, wherein the active transmission configuration state is at least one of configured by radio resource control (RRC) message or further indicated or down selected by a media access control (MAC) control element (CE) for the reference signal.

75. The apparatus of example 74, wherein the one or more processors are configured to generate the one or more configurations at least in part by indicating the active transmission configuration state as one of the one or more active transmission configuration states based on detecting a distinct transmission configuration identifier or a distinct quasi-colocation (QCL) type of the active transmission configuration state.

76. The apparatus of any of examples 64 to 75, wherein the one or more configurations of active transmission configuration states correspond to selected transmission configuration states indicated in at least one of a media access control (MAC) control element (CE) or a radio resource control (RRC) signal sent to the UE and related to at least one of a downlink control channel or a downlink shared channel.

77. An apparatus for wireless communication, comprising:
 means for receiving, from a user equipment (UE), a message comprising data corresponding to one or more transmission configuration states supported by the UE for detecting downlink beamformed signals;
 means for generating, based, at least in part, on the message, a response corresponding to one or more active transmission configuration states, wherein an active transmission configuration state of the one or more active transmission configuration states corresponds to one of multiple possible triggers for a reference signal; and
 means for transmitting the response to the UE.

78. The apparatus of example 77, wherein the data is indicative, at least in part, of one or more transmission configuration indicator (TCI) states corresponding to the one or more transmission configuration states.

79. The apparatus of any of examples 77 or 78, wherein the data is indicative, at least in part, of a number of the one or more transmission configuration states.

80. The apparatus of any of examples 77 to 79, wherein the reference signal comprises an aperiodic channel state information reference signal (A-CSI-RS).

81. The apparatus of example 80, wherein the A-CSI-RS is in one transmission configuration state selected by a media access control (MAC)-control element (CE) or radio resource control (RRC) for physical downlink control channel (PDCCH) or physical downlink shared channel (PDSCH) transmission.

82. The apparatus of any of examples 77 to 81, wherein the multiple possible triggers have different transmission configuration states for the reference signal.

83. The apparatus of any of examples 77 to 82, wherein the response is indicative, at least in part, of one or more configurations of the one or more active transmission configuration states.

84. The apparatus of any of examples 77 to 83, wherein the response is indicative, at least in part, of one or more active transmission configuration indicator (TCI) states corresponding to the one or more active transmission configuration states.

85. A computer-readable medium, comprising code executable by one or more processors for wireless communications, the code comprising:

code for receiving, from a user equipment (UE), a message comprising data corresponding to one or more transmission configuration states supported by the UE for detecting downlink beamformed signals;

code for generating, based, at least in part, on the message, a response corresponding to one or more active transmission configuration states, wherein an active transmission configuration state of the one or more active transmission configuration states corresponds to one of multiple possible triggers for a reference signal; and code for transmitting the response to the UE.

86. The computer-readable medium of example 85, wherein the data is indicative, at least in part, of one or more transmission configuration indicator (TCI) states corresponding to the one or more transmission configuration states.

87. The computer-readable medium of any of examples 85 or 86, wherein the data is indicative, at least in part, of a number of the one or more transmission configuration states.

88. The computer-readable medium of any of examples 85 to 87, wherein the reference signal comprises an aperiodic channel state information reference signal (A-CSI-RS).

89. The computer-readable medium of example 88, wherein the A-CSI-RS is in one transmission configuration state selected by a media access control (MAC)-control element (CE) or radio resource control (RRC) for physical downlink control channel (PDCCH) or physical downlink shared channel (PDSCH) transmission.

90. The computer-readable medium of any of examples 85 to 89, wherein the multiple possible triggers have different transmission configuration states for the reference signal.

91. The computer-readable medium of any of examples 85 to 90, wherein the response is indicative, at least in part, of one or more configurations of the one or more active transmission configuration states.

92. The computer-readable medium of any of examples 85 to 91, wherein the response is indicative, at least in part, of one or more active transmission configuration indicator (TCI) states corresponding to the one or more active transmission configuration states.

93. A method of wireless communication, comprising:

indicating a capability of a number of transmission configuration indicator (TCI) states supported for detecting downlink beamformed signals;

receiving, from at least an access point and based on the capability, one or more configurations of active TCI states;

processing the one or more configurations to determine the active TCI states, wherein at least one of the active TCI states in the one or more configurations corresponds to a trigger state for transmitting a given aperiodic channel state information reference signal (A-CSI-RS) and at least another one of the active TCI states in the one or more configurations corresponds to a different trigger state for transmitting the given A-CSI-RS; and detecting, based on processing the one or more configurations, one or more downlink beamformed signals received from the access point.

What is claimed is:

1. A method of wireless communication, comprising, at a user equipment (UE):

transmitting a message comprising data corresponding to one or more active transmission configuration states supported by the UE for detecting downlink beamformed signals;

receiving, from at least an access point and based on the message, a response corresponding to one or more active transmission configuration states;

determining the one or more active transmission configuration states based, at least in part, on the response, wherein an active transmission configuration state of the determined active transmission configuration states corresponds to, for a selected transmission configuration state, one of multiple possible triggers for a reference signal; and detecting, based on at least one of the determined active transmission configuration states, one or more downlink beamformed signals transmitted by the access point.

2. The method of claim 1, wherein the data is indicative, at least in part, of one or more transmission configuration indicator (TCI) states corresponding to the one or more transmission configuration states.

3. The method of claim 1, wherein the data is indicative, at least in part, of a number of the one or more transmission configuration states.

4. The method of claim 1, wherein the reference signal comprises an aperiodic channel state information reference signal (A-CSI-RS).

5. The method of claim 4, wherein the A-CSI-RS is in one TCI state selected by a media access control (MAC)-control element (CE) or radio resource control (RRC) for physical downlink control channel (PDCCH) or physical downlink shared channel (PDSCH) transmission.

6. The method of claim 4, wherein the A-CSI-RS is configured with a certain number of trigger states, wherein each trigger state has its own TCI state.

7. The method of claim 6, wherein the number of trigger states of the A-CSI-RS is configured based on the message.

8. The method of claim 1, wherein the response comprises at least one of: a CSI-RS, semi-persistent CRS, or aperiodic CSI-RS (A-CSI-RS).

9. The method of claim 8, wherein the A-CSI-RS comprises a number of trigger states, which are configurable based on the message.

10. The method of claim 1, wherein the multiple possible triggers have different transmission configuration states for the reference signal.

11. The method of claim 1, wherein the response is indicative, at least in part, of one or more configurations of the one or more active transmission configuration states.

12. The method of claim 1, wherein the response is indicative, at least in part, of one or more active transmission configuration indicator (TCI) states corresponding to the one or more active transmission configuration states.

13. The method of claim 1, wherein one or more additional active transmission configuration states indicated in the response correspond to, for the selected transmission configuration state, another one of the multiple possible triggers for the reference signal.

14. The method of claim 1, wherein the reference signal comprises an aperiodic channel state information reference signal (A-CSI-RS) and wherein one or more additional active transmission configuration states indicated in the response correspond to a transmission configuration state that does not include an A-CSI-RS.

15. The method of claim 1, wherein the active transmission configuration state corresponds to a transmission configuration state that is at least one of configured by a radio resource control (RRC) message or further indicated or down selected by a media access control (MAC) control element (CE).

16. The method of claim 11, wherein determining the one or more active transmission configuration states is based on detecting a distinct transmission configuration identifier or a distinct quasi-colocation (QCL) type of the active transmission configuration state.

17. The method of claim 1, wherein the one or more active transmission configuration states include selected transmission configuration states indicated in at least one of a media access control (MAC) control element (CE) or a radio resource control (RRC) signal related to at least one of a downlink control channel or a downlink shared channel.

18. An apparatus for wireless communication, comprising:
    a transceiver;
    a memory configured to store instructions; and
    one or more processors communicatively coupled with the transceiver and the memory, wherein the one or more processors are configured to:
        transmit a message comprising data corresponding to one or more active transmission configuration states supported by the apparatus for detecting downlink beamformed signals;
        receive, from at least an access point and based on the message, a response corresponding to one or more active transmission configuration states;
        determine the one or more active transmission configuration states based, at least in part, on the response, wherein an active transmission configuration state of the determined active transmission configuration states corresponds to, for a selected transmission configuration state, one of multiple possible triggers for a reference signal; and
        detect, based on at least one of the determined active transmission configuration states, one or more downlink beamformed signals transmitted by the access point.

19. The apparatus of claim 18, wherein the data is indicative, at least in part, of one or more transmission configuration indicator (TCI) states corresponding to the one or more transmission configuration states.

20. The apparatus of claim 18, wherein the data is indicative, at least in part, of a number of the one or more transmission configuration states.

21. The apparatus of claim 18, wherein the reference signal comprises an aperiodic channel state information reference signal (A-CSI-RS).

22. The apparatus of claim 21, wherein the A-CSI-RS is in one TCI state selected by a media access control (MAC)-control element (CE) or radio resource control (RRC) for physical downlink control channel (PDCCH) or physical downlink shared channel (PDSCH) transmission.

23. The apparatus of claim 18, wherein the multiple possible triggers have different transmission configuration states for the reference signal.

24. The apparatus of claim 18, wherein the response is indicative, at least in part, of one or more configurations of the one or more active transmission configuration states.

25. The apparatus of claim 18, wherein the response is indicative, at least in part, of one or more active transmission configuration indicator (TCI) states corresponding to the one or more active transmission configuration states.

26. The apparatus of claim 18, wherein one or more additional active transmission configuration states indicated in the response correspond to, for the selected transmission configuration state, another one of the multiple possible triggers for the reference signal.

27. The apparatus of claim 18, wherein the reference signal comprises an aperiodic channel state information reference signal (A-CSI-RS) and wherein one or more additional active transmission configuration states indicated in the response correspond to a transmission configuration state that does not include an A-CSI-RS.

28. The apparatus of claim 18, wherein the active transmission configuration state corresponds to a transmission configuration state that is at least one of configured by a radio resource control (RRC) message or further indicated or down selected by a media access control (MAC) control element (CE).

29. The apparatus of claim 28, wherein the one or more processors are configured to determine the one or more active transmission configuration state based on detecting a distinct transmission configuration identifier or a distinct quasi-colocation (QCL) type of the active transmission configuration state.

30. The apparatus of claim 18, wherein the one or more active transmission configuration states include selected transmission configuration states indicated in at least one of a media access control (MAC) control element (CE) or a radio resource control (RRC) signal related to at least one of a downlink control channel or a downlink shared channel.

31. An apparatus for wireless communication, comprising:
    means for transmitting a message comprising data corresponding to one or more active transmission configuration states supported by the apparatus for detecting downlink beamformed signals;
    means for receiving, from at least an access point and based on the message, a response corresponding to one or more active transmission configuration states;
    means for determining the one or more active transmission configuration states based, at least in part, on the response, wherein an active transmission configuration state of the determined active transmission configuration states corresponds to, for a selected transmission configuration state, one of multiple possible triggers for a reference signal; and
    means for detecting, based on at least one of the determined active transmission configuration states, one or more downlink beamformed signals transmitted by the access point.

32. A non-transitory computer-readable medium, comprising code executable by one or more processors for wireless communications by a user equipment (UE), the code comprising:
    code for transmitting a message comprising data corresponding to one or more active transmission configuration states supported by the UE for detecting downlink beamformed signals;
    code for receiving, from at least an access point and based on the message, a response corresponding to one or more active transmission configuration states;
    code for determining the one or more active transmission configuration states based, at least in part, on the response, wherein an active transmission configuration state of the determined active transmission configuration states corresponds to, for a selected transmission configuration state, one of multiple possible triggers for a reference signal; and code for detecting, based on at least one of the determined active transmission configuration states, one or more downlink beamformed signals transmitted by the access point.

33. A method of wireless communication, comprising, at an access point:

receiving, from a user equipment (UE), a message comprising data corresponding to one or more transmission configuration states supported by the UE for detecting downlink beamformed signals;

generating, based, at least in part, on the message, a response corresponding to one or more active transmission configuration states, wherein an active transmission configuration state of the one or more active transmission configuration states corresponds to, for a selected transmission configuration state, one of multiple possible triggers for a reference signal; and transmitting the response to the UE.

34. The method of claim 33, wherein the data is indicative, at least in part, of one or more transmission configuration indicator (TCI) states corresponding to the one or more transmission configuration states.

35. The method of claim 33, wherein the data is indicative, at least in part, of a number of the one or more transmission configuration states.

36. The method of claim 33, wherein the reference signal comprises an aperiodic channel state information reference signal (A-CSI-RS).

37. The method of claim 36, wherein the A-CSI-RS is in one transmission configuration state selected by a media access control (MAC)-control element (CE) or radio resource control (RRC) for physical downlink control channel (PDCCH) or physical downlink shared channel (PDSCH) transmission.

38. The method of claim 36, wherein the A-CSI-RS is configured with a certain number of trigger states, wherein each trigger state has its own TCI state.

39. The method of claim 38, wherein the number of trigger states of the A-CSI-RS is configured based on the message.

40. The method of claim 33, wherein the response comprises at least one of: a CSI-RS, semi-persistent CRS, or aperiodic CSI-RS (A-CSI-RS).

41. The method of claim 40, wherein the A-CSI-RS comprises a number of trigger states, which are configurable based on the message.

42. The method of claim 33, wherein the multiple possible triggers have different transmission configuration states for the reference signal.

43. The method of claim 33, wherein the response is indicative, at least in part, of one or more configurations of the one or more active transmission configuration states.

44. The method of claim 33, wherein the response is indicative, at least in part, of one or more active transmission configuration indicator (TCI) states corresponding to the one or more active transmission configuration states.

45. The method of claim 33, further comprising transmitting, based on the one or more configurations, one or more beamformed signals to the UE.

46. The method of claim 33, wherein the reference signal comprises an aperiodic channel state information reference signal (A-CSI-RS), and wherein one or more additional active transmission configuration states indicated in the response each represent one of the one or more active transmission configuration states in the one or more configurations and correspond to either a first TCI state that does not include the A-CSI-RS or a second TCI state that includes another one of multiple possible triggers for the A-CSI-RS.

47. The method of claim 33, wherein the active transmission configuration state is at least one of configured by radio resource control (RRC) message or further indicated or down selected by a media access control (MAC) control element (CE) for the reference signal.

48. The method of claim 47, wherein generating the response includes indicating the one or more active transmission configuration states based on detecting a distinct transmission configuration identifier or a distinct quasi-colocation (QCL) type of the active transmission configuration state.

49. The method of claim 33, wherein the one or more active transmission configuration states correspond to selected transmission configuration states indicated in at least one of a media access control (MAC) control element (CE) or a radio resource control (RRC) signal sent to the UE and related to at least one of a downlink control channel or a downlink shared channel.

50. An apparatus for wireless communication, comprising:

a transceiver;

a memory configured to store instructions; and one or more processors communicatively coupled with the transceiver and the memory, wherein the one or more processors are configured to:

receive, from a user equipment (UE), a message comprising data corresponding to one or more transmission configuration states supported by the UE for detecting downlink beamformed signals;

generate, based, at least in part, on the message, a response corresponding to one or more active transmission configuration states, wherein an active transmission configuration state of the one or more active transmission configuration states corresponds to, for a selected transmission configuration state, one of multiple possible triggers for a reference signal; and transmit the response to the UE.

51. The apparatus of claim 50, wherein the data is indicative, at least in part, of one or more transmission configuration indicator (TCI) states corresponding to the one or more transmission configuration states.

52. The apparatus of claim 50, wherein the data is indicative, at least in part, of a number of the one or more transmission configuration states.

53. The apparatus of claim 50, wherein the reference signal comprises an aperiodic channel state information reference signal (A-CSI-RS).

54. The apparatus of claim 53, wherein the A-CSI-RS is in one transmission configuration state selected by a media access control (MAC)-control element (CE) or radio resource control (RRC) for physical downlink control channel (PDCCH) or physical downlink shared channel (PDSCH) transmission.

55. The apparatus of claim 50, wherein the multiple possible triggers have different transmission configuration states for the reference signal.

56. The apparatus of claim 50, wherein the response is indicative, at least in part, of one or more configurations of the one or more active transmission configuration states.

57. The apparatus of claim 50, wherein the response is indicative, at least in part, of one or more active transmission configuration indicator (TCI) states corresponding to the one or more active transmission configuration states.

58. The apparatus of claim 50, wherein the one or more processors are further configured to transmit, based on the one or more configurations, one or more beamformed signals to the UE.

59. The apparatus of claim 50, wherein the reference signal comprises an aperiodic channel state information reference signal (A-CSI-RS), and wherein one or more additional active transmission configuration states indicated in the response each represent one of the one or more active transmission configuration states in the one or more configurations and correspond to either a first TCI state that does not include the A-CSI-RS or a second TCI state that includes another one of multiple possible triggers for the A-CSI-RS.

60. The apparatus of claim 50, wherein the active transmission configuration state is at least one of configured by radio resource control (RRC) message or further indicated or down selected by a media access control (MAC) control element (CE) for the reference signal.

61. The apparatus of claim 60, wherein the one or more processors are configured to generate the response at least in part by indicating the one or more active transmission configuration states based on detecting a distinct transmission configuration identifier or a distinct quasi-colocation (QCL) type of the active transmission configuration state.

62. The apparatus of claim 50, wherein the one or more active transmission configuration states correspond to selected transmission configuration states indicated in at least one of a media access control (MAC) control element (CE) or a radio resource control (RRC) signal sent to the UE and related to at least one of a downlink control channel or a downlink shared channel.

63. An apparatus for wireless communication, comprising:
means for receiving, from a user equipment (UE), a message comprising data corresponding to one or more transmission configuration states supported by the UE for detecting downlink beamformed signals;
means for generating, based, at least in part, on the message, a response corresponding to one or more active transmission configuration states, wherein an active transmission configuration state of the one or more active transmission configuration states corresponds to, for a selected transmission configuration state, one of multiple possible triggers for a reference signal; and
means for transmitting the response to the UE.

64. A non-transitory computer-readable medium, comprising code executable by one or more processors for wireless communications, the code comprising:
code for receiving, from a user equipment (UE), a message comprising data corresponding to one or more transmission configuration states supported by the UE for detecting downlink beamformed signals;
code for generating, based, at least in part, on the message, a response corresponding to one or more active transmission configuration states, wherein an active transmission configuration state of the one or more active transmission configuration states corresponds to, for a selected transmission configuration state, one of multiple possible triggers for a reference signal; and
code for transmitting the response to the UE.

65. A method of wireless communication, comprising:
indicating a capability of a number of transmission configuration indicator (TCI) states supported for detecting downlink beamformed signals;
receiving, from at least an access point and based on the capability, one or more configurations of active TCI states;
processing the one or more configurations to determine the active TCI states, wherein at least one of the active TCI states in the one or more configurations corresponds to a trigger state for transmitting a given aperiodic channel state information reference signal (A-CSI-RS) and at least another one of the active TCI states in the one or more configurations corresponds to, for a selected TCI state, a different trigger state for transmitting the given A-CSI-RS; and
detecting, based on processing the one or more configurations, one or more downlink beamformed signals received from the access point.

* * * * *